United States Patent
Benisty et al.

(10) Patent No.: US 11,983,428 B2
(45) Date of Patent: May 14, 2024

(54) DATA MIGRATION VIA DATA STORAGE DEVICE PEER CHANNEL

(71) Applicant: Western Digital Technologies, Inc., San Jose, CA (US)

(72) Inventors: Shay Benisty, Beer Sheva (IL); Amir Rozen, Rishon Lezion (IL); Amir Segev, Meitar (IL)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 17/834,209

(22) Filed: Jun. 7, 2022

(65) Prior Publication Data
US 2023/0393772 A1    Dec. 7, 2023

(51) Int. Cl.
*G06F 12/00* (2006.01)
*G06F 3/06* (2006.01)

(52) U.S. Cl.
CPC .......... *G06F 3/0647* (2013.01); *G06F 3/0607* (2013.01); *G06F 3/0683* (2013.01)

(58) Field of Classification Search
CPC .. G06F 3/0659; G06F 3/0688; G06F 11/0766; G06F 11/106; G06F 11/1092; G06F 2211/1028; G06F 2211/1088; G06F 3/0604; G06F 3/0614; G06F 3/0619; G06F 3/0653; G06F 3/0656; G06F 3/067; G06F 3/0689; G06F 9/485
See application file for complete search history.

(56) References Cited

U.S. PATENT DOCUMENTS

| | | | |
|---|---|---|---|
| 9,116,624 B2 | 8/2015 | Canepa et al. | |
| 10,860,447 B2 | 12/2020 | Yu et al. | |
| 10,901,848 B2 | 1/2021 | Roberts | |
| 2019/0102293 A1 | 4/2019 | Li et al. | |
| 2021/0281639 A1 | 9/2021 | Kachare et al. | |
| 2021/0294769 A1* | 9/2021 | Shim | G06F 3/0688 |
| 2022/0164139 A1 | 5/2022 | Moshe et al. | |

OTHER PUBLICATIONS

Advanced Micro Devices, Inc., AMD Crossfire™ Technology, 2022, retrieved from https://www.amd.com/en/technologies/crossfire on May 18, 2022, 4 pgs.
NVIDIa Corporation, SLI Desktop Technologies, 2021, retrieved from https://docs.nvidia.com/gameworks/content/technologies/desktop/sli.htm on May 18, 2022, 5 pgs.
NVIDIA Corporation, NVLink & NVSwitch for Advanced Multi-GPU Communication, 2022, retrieved from https://www.nvidia.com/en-us/data-center/nvlink/ on May 18, 2022, 8 pgs.

* cited by examiner

*Primary Examiner* — Yong J Choe
(74) *Attorney, Agent, or Firm* — Patent Law Works LLP

(57) ABSTRACT

Systems and methods for data migration via a peer communication channel between data storage devices are disclosed. The data storage devices include a host interface configured to connect to at least one host system and a peer interface to connect to the peer communication channel, where the host interface and the peer interface and separate physical interfaces. A source data storage device establishes peer communication with a destination data storage device over the peer communication channel, determines a set of host data, and sends the set of host data to the destination data storage device, while continuing to receive and process host storage operations through the host interface.

21 Claims, 7 Drawing Sheets

DATA MIGRATION VIA DATA STORAGE DEVICE PEER CHANNEL

TECHNICAL FIELD

The present disclosure generally relates to data storage devices in multi-device storage systems and, more particularly, to peer device communication through a peer channel that avoids host interface resources.

BACKGROUND

Some computing systems, such as storage arrays, may include multiple storage devices supporting one or more host systems through a peripheral or storage interface bus, such as peripheral component interconnect express (PCIe), serial advanced technology attachment (SATA), or serial attached [small computer serial interface (SCSI)] (SAS). These interfaces may be configured for high-bandwidth transfer rates, such as 3 gigabits (Gb)/second (s), 6 Gb/s, 8 Gb/s, 12 Gb/s, 16 Gb/s, etc., to enable fast and reliable data transfer to and from storage devices, with some versions supporting as high as 512 Gb/s.

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. Some multi-device storage systems employ storage devices capable of communicating with one another and/or host systems over the interconnecting fabric and/or network fabric through the high-bandwidth interface. Such fabric-based distributed storage systems may include storage devices configured with direct memory access to enable more efficient transfer of data to and from hosts and other systems.

In some configurations, the storage system may support multiple hosts and be configured to maximize the throughput of the host storage interface. For example, the host storage operations input/output (I/O) operates close to the full resources of the host storage interfaces of the set of data storage devices in terms of bandwidth, particularly during peak operating times. Maintenance operations, particularly those involving replication of data from one data storage device to another may divert host storage interface resources and slow host storage operations, sometimes threatening the quality of service (QoS) levels required of the storage system. Even prior storage systems with peer-to-peer connections over the fabric interface may be using the same physical interface, such as the PCIe connection, and related bandwidth to communicate with peer devices. While these peer-to-peer systems may offload some of the host or controller processing and communication, peer-to-peer data transfer is still managed through the same host storage interface to the individual data storage devices.

A secondary channel for migrating host data between peer data storage devices without using the host storage interface may be needed.

SUMMARY

Various aspects for host data migration through a peer channel, particularly use of a peer communication channel through a separate physical interface from the host storage interface, are described.

One general aspect includes a system including a first data storage device that includes: a processor; a memory; a non-volatile storage medium configured to store host data; a host interface configured to connect to at least one host system; a peer interface configured to connect to a peer communication channel, where a plurality of peer data storage devices is configured to connect to the peer communication channel and the host interface and the peer interface may include separate physical interfaces; and a peer interface service configured to: establish, through the peer communication channel, peer communication with a target peer data storage device from the plurality of peer data storage devices; determine a set of host data from the non-volatile storage medium; and send, through the peer communication channel, the set of host data to the target peer data storage device.

Implementations may include one or more of the following features. The first storage device may include: a storage interface protocol configured for communication with the host system through the host interface; a controller memory buffer accessible to the at least one host system through the host interface; a non-volatile memory device controller configured to manage data input/output to the non-volatile storage medium; and a storage buffer, controlled by the non-volatile memory device controller, configured to temporarily store data input/output to the non-volatile storage medium, where the peer interface service is further configured to send the set of host data through the peer communication channel from the storage buffer to the target peer data storage device. The system may include the target data storage device including: a target non-volatile storage medium configured to store host data; a target peer interface configured to connect to the peer communication channel; a target non-volatile memory device controller configured to manage data input/output to the target non-volatile storage medium; and a target storage buffer, controlled by the target non-volatile memory device controller, configured to temporarily store data input/output to the target non-volatile storage medium and receive, through the peer communication channel, the set of host data from the first data storage device. The host interface may include a first storage interface protocol; the peer interface may include a second storage interface protocol; and the non-volatile memory device controller may be further configured to process, based on the first storage interface protocol and using the controller memory buffer, host data storage operations in parallel with the peer interface service sending the set of host data to the target peer data storage device. The peer interface service may be further configured to initiate, using the second storage interface protocol, a master mode prior to sending the set of host data; and the target peer data storage device may be configured, using the second storage interface protocol, to initiate a slave mode prior to receiving the set of host data. The peer interface may include a physical debug port and be further configured to switch between a debug mode and a peer communication channel mode. The peer interface service may be further configured to: determine a peer transfer queue; add the set of host data blocks to the peer transfer queue; monitor transfer of the set of host data blocks over the peer communication channel; and determine whether the set of host blocks have been successfully transferred to the target peer data storage device. The peer interface service may be further configured to: determine host storage operations targeting the set of host data blocks; add, responsive to the host storage operations targeting the set of host data blocks, updated host data blocks to the peer transfer queue; receive, from a storage controller, a changeover notification; complete, during a changeover time period, transfer of the host data blocks in the peer transfer queue; and send, to the storage controller and responsive to completion of the transfer of the host data blocks in the peer transfer queue, a queues clear notification. The system may include a storage controller including a controller processor, a controller memory, and a drive manager configured to: determine a maintenance condition of the first data storage device; determine the set of host data; determine the target peer data storage device from the plurality of peer data storage devices; send a migration source notification to the first data storage device; and send a migration destination notification to the target peer data storage device. The drive manager may be further configured to: determine a set of physical functions corresponding to the set of host data; send, during a migration window, host storage operations targeting the set of host data to the first data storage device; receive, from the first data storage device, a transfer complete notification; initiate a changeover window; during the changeover window, pause host storage operations targeting the set of host data, copy the set of physical functions from a first configuration for the first data storage device to a second configuration for the target peer data storage device, and map the target peer data storage device to at the at least one host system for the set of host data; and initiate a maintenance operation for the first data storage device.

Another general aspect includes a computer-implemented method that includes: establishing, from a first data storage device, peer communication with a target peer data storage device from a plurality of peer data storage devices, where the first data storage device and the plurality of peer data storage devices include a non-volatile storage medium configured to store host data, a host interface configured to connect to at least one host system, and a peer interface configured to connect to a peer communication channel (the host interface and the peer interface may include separate physical interfaces); determining, by the first data storage device, a set of host data from the non-volatile storage medium of the first data storage device; and sending, through the peer communication channel, the set of host data to the target peer data storage device.

Implementations may include one or more of the following features. The computer-implemented method may include: reading, by the first data storage device, the set of host data from the non-volatile storage medium of the first data storage device into a first storage buffer of the first data storage device; and receiving, by the target peer data storage device, the set of host data to a second storage buffer of the target peer data storage device, where sending the set of host data is from the first storage buffer, the second storage buffer is configured to temporarily store the set of host data prior to storing the set of host data in the non-volatile storage medium of the target peer data storage device, the first storage buffer is separate from a controller memory buffer of the first data storage device, the second storage buffer is separate from a controller memory buffer of the target peer data storage device; and the controller memory buffers are accessible to the at least one host system through the host interfaces. The computer-implemented method may include processing, by the first data storage device and using the controller memory buffer of the first data storage device, host data storage operations in parallel with the sending the set of host data to the target peer data storage device. The computer-implemented method may include: initiating, by the first data storage device and using a second storage interface protocol, a master mode prior to sending the set of host data; and initiating, by the target peer data storage device and using the second storage interface protocol, a slave mode prior to receiving the set of host data, where the first data storage device and the plurality of peer data storage devices use a first storage interface protocol for receiving host storage operations from the at least one host system. the computer-implemented method may include switching between a debug mode and a peer communication channel mode for using a physical debug port, where the peer interface may include the physical debug port. The computer-implemented method may include: determining, by the first data storage device, a peer transfer queue; adding, by the first data storage device, the set of host data blocks to the peer transfer queue; monitoring, by the first data storage device, transfer of the set of host data blocks over the peer communication channel; and determining, by the first data storage device, whether the set of host blocks have been successfully transferred to the target peer data storage device. The computer-implemented method may include: determining, by the first data storage device, host storage operations targeting the set of host data blocks; adding, by the first data storage device and responsive to the host storage operations targeting the set of host data blocks, updated host data blocks to the peer transfer queue; receiving, by the first data storage device and from a storage controller, a changeover notification; completing, by the first data storage device and during a changeover time period, transfer of the host data blocks in the peer transfer queue; and sending, from the first data storage device to the storage controller and responsive to completion of the transfer of the host data blocks in the peer transfer queue, a queues clear notification. The computer-implemented method may include: determining, by a storage controller in communication with the first data storage device and the plurality of peer data storage devices, a maintenance condition of the first data storage device; determining, by the storage controller, the set of host data; determining, by the storage controller, the target peer data storage device from the plurality of peer data storage devices; sending, by the storage controller, a migration source notification to the first data storage device; and sending, by the storage controller, a migration destination notification to the target peer data storage device. The computer-implemented method may include: determining, by the storage controller, a set of physical functions corresponding to the set of host data; sending, by the storage controller and during a migration window, host storage operations targeting the set of host data to the first data storage device; receiving, by the storage controller and from the first data storage device, a transfer complete notification; initiating, by the storage controller, a changeover window; during the changeover window, pausing, by the storage controller, host storage operations targeting the set of host data, copying, by the storage controller, the set of physical functions from a first configuration for the first data storage device to a second configuration for the target peer data storage device, and mapping, by the storage controller, the target peer data storage device to at the at least one host system for the set of host data; and initiating, by the storage controller, a maintenance operation for the first data storage device.

Still another general aspect includes a storage system including a peer communication channel and a plurality of peer data storage devices, where each peer data storage device of the plurality of peer data storage devices includes: a processor; a memory; a non-volatile storage medium; a host interface configured to connect to at least one host system; a peer interface configured to connect to the peer communication channel, where the host interface and the peer interface are separate physical interfaces; means for establishing, through the peer communication channel, peer communication with a target peer data storage device from the plurality of peer data storage devices; means for determining a set of host data from the non-volatile storage medium; and means for sending, through the peer communication channel, the set of host data to the target peer data storage device.

The various embodiments advantageously apply the teachings of storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve the migration of host data for maintenance operations, such as by using a peer communication channel through a physical interface that is separate from the host storage interface. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
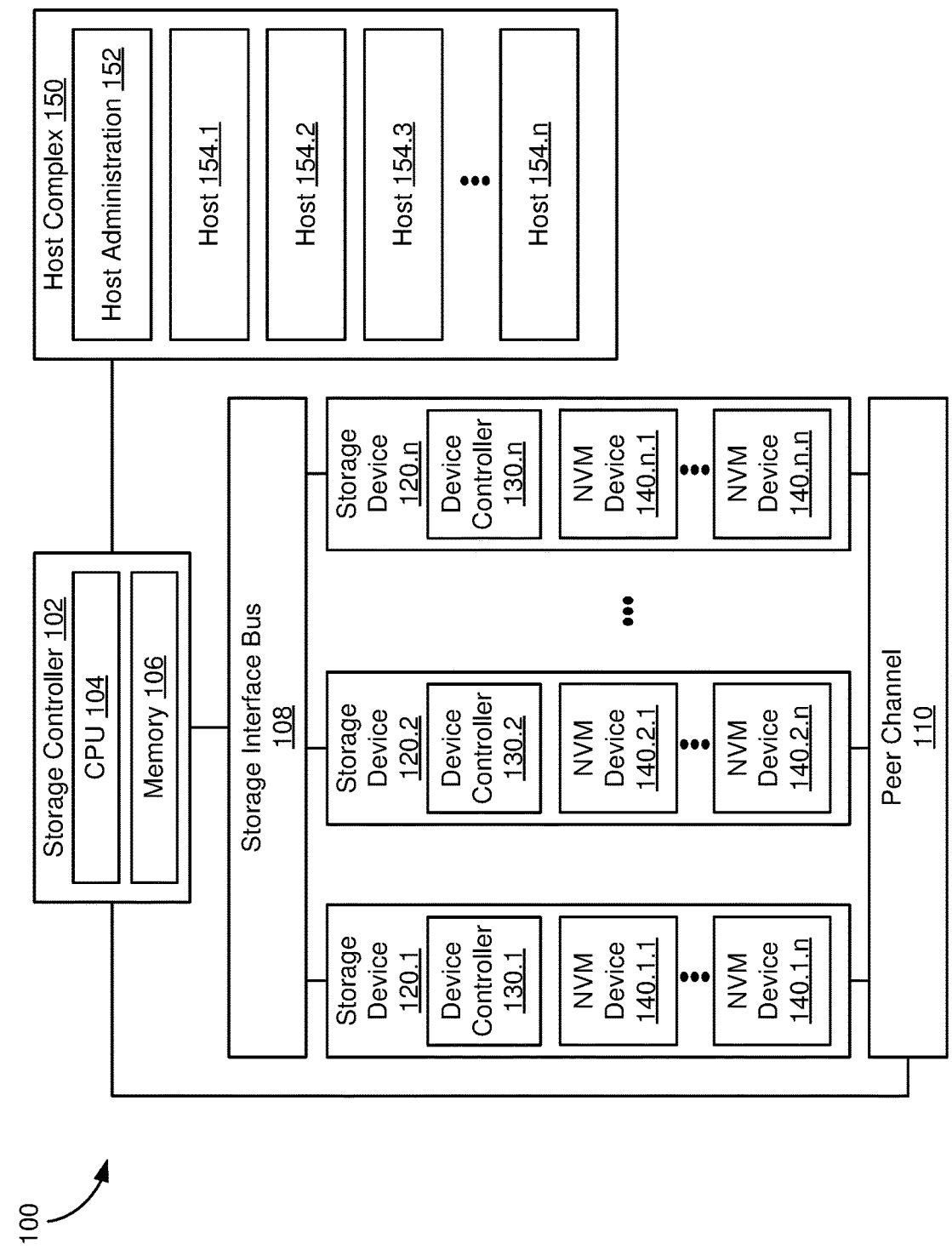
FIG. 1 schematically illustrates a multi-device storage system with a storage interface bus and a separate peer channel.

FIG. 1 shows an embodiment of an example data storage system 100 with data storage devices 120 interconnected by both a storage interface bus 108 and a peer channel 110, where storage interface bus 108 and peer channel 110 connect to data storage devices 120 through separate physical interface connections. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server, storage array blade, or similar storage unit for use in data center storage racks or chassis. Storage devices 120 may interface with one or more storage controllers 102 and provide data storage and retrieval capabilities for or through storage controller 102 to support one or more hosts 154 in a host complex 150. In some embodiments, storage devices 120 may be configured in a storage hierarchy that includes storage nodes, storage controllers (e.g., storage controller 102), and/or other intermediate components between storage devices 120 and hosts 154. For example, each storage controller 102 may be responsible for a corresponding set of storage nodes and their respective storage devices 120 connected through a corresponding backplane network.

In the embodiment shown, a number of storage devices 120 are attached to a common storage interface bus 108 for host communication. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or peer channel 110. For example, storage devices 120 may connect to storage interface bus 108 and/or peer channel 110 through a plurality of physical port connections that define physical, transport, and other logical channels for establishing communication with the different components and subcomponents for establishing a communication channel to storage controller 102 and/or peer channel 110. In some embodiments, storage interface bus 108 may provide the primary host interface for storage device management and host data transfer, and peer channel 110 may provide a secondary data transfer channel between storage devices 120 that is not accessible to hosts 154 for host data transfer. In some configurations, storage devices 120 may include other interfaces (not shown), such as a control bus interface used for low-bandwidth communications related to storage device power states, configuration, and management, such as control bus connections to a baseboard management controller (BMC), In some embodiments, storage devices 120 may be referred to as a peer group or peer storage devices because they are interconnected through storage interface bus 108 and/or peer channel 110. In some embodiments, storage devices 120 may be configured for peer communication among storage devices 120 through storage interface bus 108, with or without the assistance of storage controller 102 and/or hosts 154. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth host storage interface and storage interface bus 108.

In some embodiments, storage devices 120 may be configured for peer communication using a storage protocol with a limited command set and physical and link protocols configured for a smaller physical footprint than a PCIe host storage interface (typically based on a ×16 or ×32 lane PCIe ports for high-performance storage applications). For example, storage devices 120 may be configured for packet-based messaging through a debug port configured for high-speed serial trace port (HSSTP) specifications for low level communication protocols and overlaid with a high-speed master/slave data transfer protocol, such as a limited command set based on PCIe, SATA, or a proprietary storage protocol. In another configuration, a second PCIe port based on a lower lane count, such as ×1, ×2, ×4, or ×8, may be used if physical space in storage devices 120 allows. Storage devices 120 may be interconnected by a common peer bus to provide a lower bandwidth storage channel among storage devices 120 that is not available to hosts 154 for host data transfer. For example, a separate cable or backplane connection may be connected to the peer channel physical interface, such as the debug port, to provide a wired connection among the peer storage devices. In some configurations, storage controller 102 may also be configured with a connection to peer channel 110 and provide limited commands related to administering peer data transfers related to storage device maintenance operations. In some configuration, storage controller 102 may not be connected to peer channel 110 and may manage peer transfers of host data through specialized storage management commands through a control portion of the host storage interface (through storage interface bus 108).

In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and peer channel 110. The physical interfaces for storage interface bus 108 and peer channel 110 may be separate ports and/or connectors that do not share pins and establish independent mating and electrical connections.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 and/or hosts or host systems 154 may be coupled to data storage system 100 through a network interface that is part of host fabric network that includes storage interface bus 108 as a host fabric interface. In some embodiments, multiple host systems 154 are coupled to data storage system 100 through the fabric network, which may include a storage network interface of storage controller 102 or other interface capable of supporting communications with multiple host systems 154. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks.

Host systems 154, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 154 are sometimes called a host, client, or client system. In some embodiments, host system 154 is a server system, such as a server system in a data center, or a storage system, such as a storage array in a data center. In some embodiments, the one or more host systems 154 are one or more host devices distinct from storage controller 102 or a storage node housing the plurality of storage devices 120. The one or more host systems 154 may be configured to store and access data in the plurality of storage devices 120 and may each be individually mapped to one or more storage devices 120 based on a virtual machine architecture. In some configurations, a group of hosts 154 may be configured in a host complex 150 supported by one or more host administration modules or systems 152. Host administration system 152 may assist in allocating hosts 154 to storage devices 120 through storage controller 102, such as based on one or more NVMe protocols.

Storage controller 102 may include one or more central processing units (CPUs) 104 (or controller processors) for executing compute operations or instructions for accessing storage devices 120 through storage interface bus 108. In some embodiments, CPU 104 may include a processor and be associated with operating controller memory 106 for executing both storage operations and a storage interface protocol compatible with storage interface bus 108 and storage devices 120. In some embodiments, a separate storage interface unit (not shown) may provide the storage interface protocol and related processor and memory resources. From the perspective of storage devices 120, storage interface bus 108 may be referred to as a host interface bus and provides a host data path between storage devices 120, storage controller 102, and/or hosts 154.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
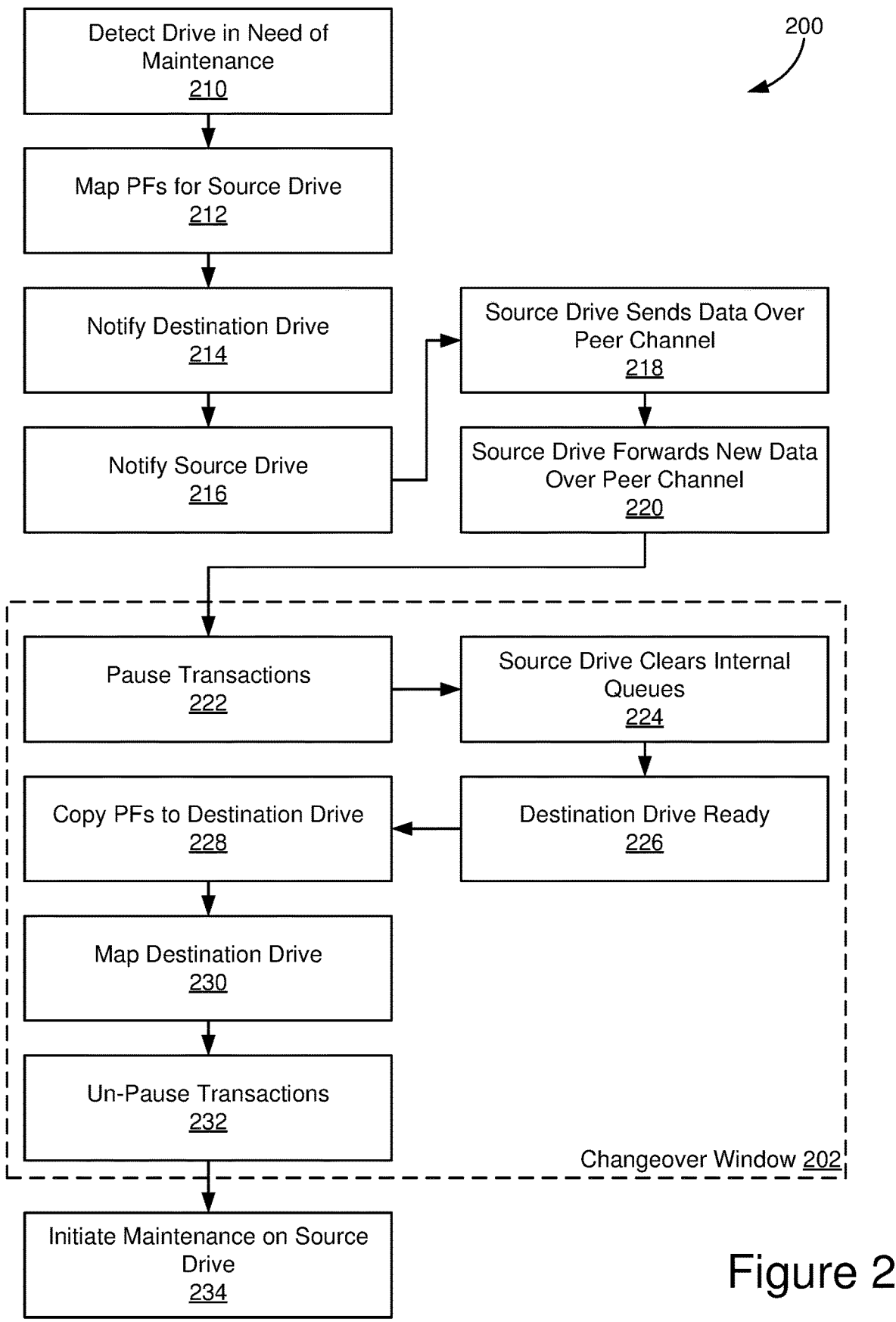
FIG. 2 schematically illustrates a host data migration process that may be used by the multi-device storage system of FIG. 1.

FIG. 2 shows an example host data migration process 200 that may be used by a multi-device storage system, such as multi-device data storage system 100 in FIG. 1, configured with a peer migration of host data over a peer communication channel. More specifically, a storage controller, such as storage controller 102, may execute blocks 210-216 to initiate the host data transfer and blocks 222 and 228-232 to reconfigure the host connections during a changeover window 202. A source peer data storage device, such as storage device 120.1, may execute blocks 218-220 and 224 for the peer transfer of host data and the destination peer data storage device, such as storage device 120.2, may execute block 226. The storage controller may also execute block 234 and/or maintenance may be initiated by the source storage device, a system administrator, or another system.

At block 210, a drive in need of maintenance may be detected. For example, the storage controller may monitor one or more health characteristics for the storage devices and determine that one of them is starting to fail, for example bit error rate, bad blocks, and/or program/erase cycles exceeding a maintenance threshold indicating that the storage device should be replaced. The storage controller may identify the drive in need of maintenance as the source drive for a host data migration and select a peer drive as the destination drive, such as another peer drive with available capacity or a hot spare in the peer group.

At block 212, the physical functions for the source drive may be mapped. For example, the storage controller may identify the set of physical function states, such as LBA mapping tables, state of queues, drive properties, configuration tables, etc. for one or more hosts mapped to the source drive and determine a corresponding set of configuration data.

At block 214, the destination drive may be notified. For example, the storage controller may send a migration notification to the destination drive indicating the source drive and the size of the host data to be transferred. This may enable the destination drive to prepare the necessary storage medium allocations and buffer space and may provide added security for peer data migrations.

At block 216, the source drive may be notified. For example, the storage controller may send a migration notification to the source drive indicating the destination drive and the set of host data to be transferred, such as all host data on the drive or a portion thereof. In some embodiments, the source drive may be the first drive notified and the source drive may notify the destination drive through the peer channel. For example, the destination drive may receive the migration notification from the source drive when the source drive initiates the data transfer connection.

At block 218, the source drive sends data over the peer channel. For example, the source drive may initiate a data transfer connection with the destination drive with the source drive as the master and the source drive as the slave for transferring host data units from the storage buffer of the source drive to the storage buffer of the destination drive through the respective peer interfaces and bus.

At block 220, the source drive forwards new host data over the peer channel. For example, during the peer transfer operations through the peer channel, the source drive may continue to receive and process host storage operations targeting the host data being migrated and may include any updated host data in the host data units to be transferred to the destination drive.

At block 222, host transactions to the host data being migrated may be paused for a time period referred to as changeover window 202. For example, the storage controller may pause the host storage operations targeting the host LBAs being transferred from the source drive and initialize a timer for monitoring the changeover window.

At block 224, the source drive may clear internal queues. For example, during the changeover window, the source drive may not receive new host storage operations and use the changeover window to process the pending operations in its host I/O and peer data transfer queues.

At block 226, the destination drive may enter a drive ready state. For example, during the changeover window, the destination drive may receive and confirm all host data transfers from the source drive and may send a drive ready notification to the storage controller and/or source device to confirm that the transferred host data is ready to support host storage operations in the destination storage device.

At block 228, physical functions for the transferred host data may be copied to the destination drive. For example, during the changeover window, the storage controller may use the set of configuration data determined at block 212 (updated based on the host storage operations executed during the peer data migration) to add new configuration parameters to the destination drive configuration for the physical functions formerly associated with the source drive.

At block 230, the destination drive may be mapped for the hosts formerly mapped to the source drive. For example, during the changeover window, the storage controller may initiate new host connections with the destination drive matching the host connections for the transferred host data that were previously supported by the source drive.

At block 232, the host transactions for the transferred host data may be unpaused. For example, upon completion of the peer data transfer and reconfiguration of the administration of the host data from the source drive to the destination drive, the storage controller may end changeover window 202 and resume processing host storage operations targeting the transferred host data, now using the destination storage device. In some configurations, changeover window 202 may have a fixed maximum time to reach data convergence and, if all steps are not completed within the changeover time period, the process may return to block 218 for another attempt to complete the peer data transfer and related administration.

At block 234, maintenance may be initiated on the source drive. For example, with the host data and corresponding host administration and storage operations transferred to the destination drive, the source drive may be decommissioned, removed/replaced, placed in reserve, or have one or more maintenance operations initiated to update, troubleshoot, reconfigure, or otherwise salvage the drive or portions thereof in need of maintenance.

Figure 3:
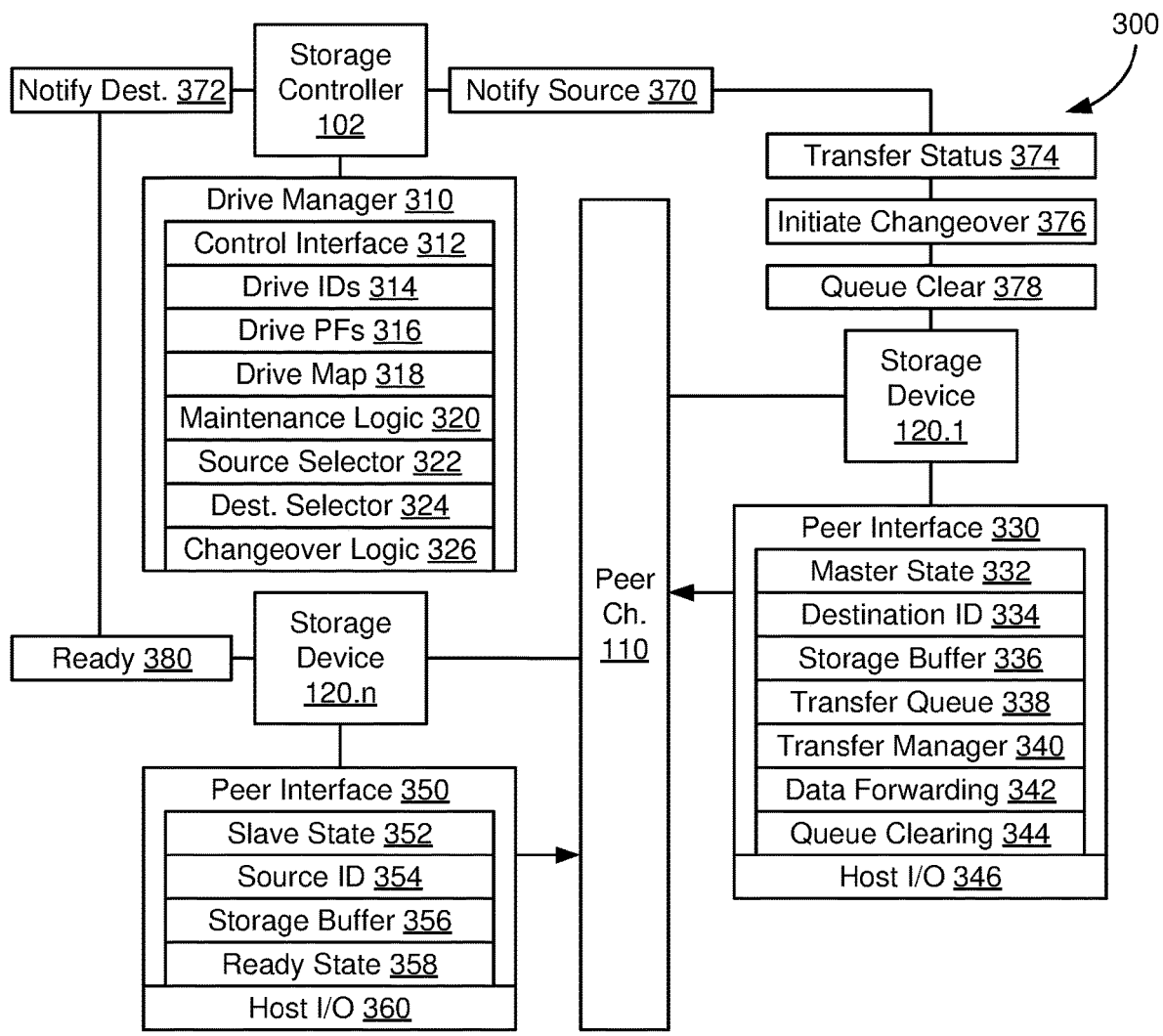
FIG. 3 schematically illustrates the systems configured for the host migration process of FIG. 2.

FIG. 3 shows a schematic representation of an example storage system 300, such as a portion of multi-device data storage system 100 in FIG. 1, configured with a peer data transfer architecture to support migration of host data through peer channel 110. Storage devices 120 may each be connected to peer channel 110 using a separate physical interface, such as a debug port or PCIe interface with a limited number of lanes or pins and a lower data rate than the host storage interface. In some embodiments, peer channel 110 supports a multi-master, packet-based messaging system that may enable storage device 120.1 to establish communication with peer storage devices through peer channel 110. For example, each storage device may be able to request or assert master control or priority in order to send messages through peer channel 110 to peer storage devices operating as slaves. Peer messaging through peer channel 110 may be independent of any communication through a primary host interface or fabric interface, such as storage interface bus 108 in FIG. 1.

Storage controller 102 may be configured with a drive manager 310 that manages peer storage devices 120 and their respective host connections. In some configurations, storage controller 102 shares a backplane or similar connection with storage devices 120 and may include a connection to peer channel 110 to allow control messages to be sent to the storage devices through peer channel 110. In some configurations, storage controller 102 may not be connected to peer channel 110 and may provide control messages for peer-to-peer transfer of host data through a control interface 312 associated with the host storage interface to storage devices 120. For example, a host storage interface based on PCIe and NVMe may enable drive management commands to storage devices 120 through storage interface bus 108, in addition to host storage operations. In some embodiments, a host system or host administration system may include drive manager 310 and use control interface 312 to initiate and manage host data migration through peer channel 110. In some embodiments, drive manager 310 may be embodied in hardware and/or software (stored in memory for execution by a processor) operating within storage controller 102 to execute the example functions of drive manager 310 further discussed below.

Drive manager 310 may include configuration data for data storage devices 120. For example, drive manager 310 may include a set of drive identifiers 314 that uniquely identify each storage device 120 and provide the physical and logical addressing information for host communications with storage devices 120 through the host storage interface. In some embodiments, drive identifiers 314 may also include addressing information for a secondary control interface 312 configured for sending and receiving control messages over peer channel 110. Drive manager 310 may include a set of drive physical function states for each storage device 120. Drive physical function states may include host LBA mapping tables, state of queues, drive properties, and other drive configuration and operation data for managing host storage operations to that storage device. Drive manager 310 may include a host drive map 318 associated with drive identifiers 314 and drive physical functions 316 that identify which hosts are mapped to which drives and, for some protocols, may define specific connections and queue pair mappings that provide host storage connections between a specific host and target storage device for host storage operations. For examples, hosts and storage devices may support a number of namespaces and each namespace may be supported by one or more queue pair connections.

In some embodiments, drive manager 310 may manage host data migration between peer storage devices 120 through peer channel 110. For example, when one of storage devices 120 needs to be replaced, drive manager 310 may initiate the peer data transfer and coordinate the handoff of the host connections from the source drive (being replaced) to the destination drive (receiving its host data and connections going forward). Drive manager 310 may include maintenance logic 320 configured to determine when a data storage device is in need of maintenance that would require host data migration to another data storage device. For example, maintenance logic 320 may be associated with one or more drive monitoring functions that track storage device use and operating parameters, such as error rates, bad blocks, and P/E cycles to determine when a storage device should be replaced. In some configurations, maintenance logic 320 may include fully automated decision logic that determines when a device meets a maintenance threshold and initiates the peer data migration and, in some configurations, maintenance logic 320 may include a user interface that allows a system administrator to determine whether and when peer data migration is initiated. In some embodiments, maintenance logic 320 may distinguish a functional (but unhealthy or outdated) data storage device in need of host data migration (and capable of completing such a migration) from a failed or failing data storage device that would be unlikely to reliably complete the host data transfer through the peer channel.

Once drive manager 310 determines that a data storage device is in need of maintenance and host data migration is appropriate, the storage device in question, such as storage device 120.1 may be designated as the source peer data storage device or source drive. Drive manager 310 may include a source selector 322 that includes logic for identifying the source drive, accessing the corresponding drive identifiers, physical function states, and drive maps for determining the scope and configuration of the host data migration, and determining the host data units to be included in the transfer (e.g., whether all of the host data in the source drive or some subset thereof). Drive manager 310 may include a destination selector that includes logic for selecting a destination peer data storage device or destination drive from among peer storage devices 120. In some configurations, peer storage devices 120 may include one or more hot spares configured as peer storage devices, but not yet storing host data or executing host storage operations, and a hot spare may be selected as the destination drive. In some configurations, destination selector 324 may include logic for evaluating the available capacity and/or workload of each of the peer storage devices to determine which peer storage device may be best able to act as the destination storage device, such as storage device 120.n. In some configurations, destination selector 324 may be able to determine multiple destination storage devices and migrate different portions of the source drive to different destination drives. In some configurations, destination selector 324 may include a user interface that allows a system administrator to select one or more destination drives. Once source and destination drives are determined, source selector 322 may send a migration source notification and destination selector 324 may send a migration destination notification through control interface 312.

In some configurations, once the peer data transfer is handed off to the source and destination storage devices, drive manager 310 may not actively manage the progress of the transfer itself. For example, drive manager 310 may be configured to wait for a notification from the source drive that a threshold level of the host data has been successfully transferred to the destination drive. During the peer data transfer, storage controller 102 may treat the source drive (and the destination drive if it has preexisting host connections) as operating drives for allocation of new host storage operations. For example, host storage operations targeting host data stored in the source drive will continue to be directed to the source drive for processing. In some configurations, storage controller 102 may limit the new host storage operations directed to the source drive to only those targeting host data units already stored in the source drive, but may direct new write operations to another data storage device with a connection to the same host (and namespace).

In some configurations, drive manager 310 may receive a notification message once all of the initial host data (the set of host data that was stored in the source drive when the transfer was initiated) has been transferred to the destination drive. In another configuration, drive manager 310 may receive the notification message when the transfer queues reach a certain queue depth or a predefined percentage of the host data has been transferred. Drive manager 310 may determine that a changeover threshold has been met by one or more of these notifications and may initiate a changeover process. Drive manager 310 may include changeover logic 326 for determining and coordinating the changeover process. For example, drive manager 310 may pause the host transactions to the host data being transferred, wait for the source drive to clear its internal queues and the destination drive to be in a ready state, copy the physical function states from the source drive configuration to the destination drive configuration, map the destination drive to the host connections previously held by the source drive, and unpause the transactions. In some embodiments, paused host data storage operations may be held in queue in storage controller 102 and/or may be rejected (to allow the host to determine handling of the delayed operations and temporarily unavailable host data). In some configurations, changeover logic 326 may include a changeover timer that tracks the time window in which these actions occur to assure that they do not exceed a changeover threshold, such as one second of paused host transactions. Once host transactions are successfully unpaused and host storage operations for the migrated host data are being supported by the destination drive, maintenance logic 320 may initiate the maintenance operation, such as powering down, initiating a firmware update or device scan, etc., or indicate that a user may initiate the maintenance operation, such as by providing a visual indicator to the user that the source drive may now be removed.

Storage device 120.1 may include a peer interface 330 configured to handle peer data transfers in response to a migration source notification. For example, each peer storage device 120 may include a peer interface that may operate in a master or slave state in the event that it is identified as a source or destination drive for a peer data transfer. Each peer storage device 120 connected to peer channel 110 may be configured to initiate one or more messages using peer storage device addresses (based on drive identifiers and the secondary port configuration used by peer channel 110) and message syntax supported by peer channel 110. Peer messages may be used by storage devices 120 to send direct messages to a target peer storage device to establish a data transfer session and move data packets including host data between their respective storage buffers. The source storage device in the master state may receive response messages from destination storage device in the slave state. Response message may be used by storage devices 120 to send messages back to the source storage device confirming receipt and storage of the transferred host data during the data transfer session. Response messages may include simple acknowledgement messages for host data unit transfer that may be part of the slave's message handling protocol.

Upon entering master state 332, storage device 120.1 may determine destination identifier 334 from the migration source notification. Storage device 120.1 may use destination identifier 334 to determine the peer channel address of storage device 120.n and initiate a handshake that places storage device 120.n in a slave state and ready for the data transfer. In some configurations, initiation of a data transfer session may include notifying storage device 120.n of the host data size and/or other configuration information for the host data transfer being initiated. In some embodiments, storage device 120.1 includes a storage buffer 336 for receiving data read from its non-volatile storage medium that can then be packaged according to the data storage protocol used to transfer the host data across peer channel 110 to the storage buffer of storage device 120.*n* (for storage to that device's non-volatile storage medium). Storage device 120.1 may use a peer data transfer queue 338 that is separate from the host storage operation queues and/or background operation queues and is populated with read commands for the host data to be transferred. Execution of those read commands by the NVM controller may read the host data from the storage medium to storage buffer 336. A transfer manager 340 may include logic for taking host data from storage buffer 336 and sending it in data transfer messages to storage device 120.*n* through peer channel 110. Operation of the NVM controller processing transfer queue 338 to read host data units into storage buffer 336 and transfer manager 340 packaging and sending them to storage device 120.*n* may be repeated until all host data has been transferred. In some embodiments, transfer manager 340 may also receive response messages from storage device 120.*n* to confirm receipt and/or non-volatile storage of each host data unit.

During the data transfer session, storage device 120.1 may continue to process host I/O 364 (i.e., host storage operations) though the host storage interface. These operations may generate additional host data to be transferred and/or invalidate host data that has already been transferred. Peer interface 330 may include data forwarding 342 for new host data written to storage device 120.1 during the data transfer session. For example, new or updated host data units may be added to transfer queue 338 and be transferred in due course as part of the data transfer session. In some configurations, invalidated data (from updated host blocks or delete operations) may not be transferred or otherwise communicated to storage device 120.*n*, because transfer of the updated drive physical functions for the host data at changeover may address the invalid blocks. During changeover, storage device 120.1 will stop receiving new host I/O 364 during the pause of the changeover window, which may enable it to use all processing (and interface) resources to clear the host storage operation queues and transfer queue 338. In some embodiments, storage device 120.1 may notify storage controller 102 based on progress of the data transfer, such as completion of the transfer of the original set of host data or another transfer progress metric, and drive manager 310 may initiate the changeover based on that progress notification. Queue clearing logic 344 may monitor the relevant queues until all transactions in queue have been completed, complete the transfer session with storage device 120.*n*, and notify storage controller 102 that data transfer is complete and all queues are clear. After changeover, storage device 120.1 will no longer be mapped to the transferred host data and will not receive further host storage transactions for that host data (or any host data if all host data is transferred). Storage device 120 may be ready for whatever shut down, removal, or whatever other maintenance triggered the host data migration.

Storage device 120.*n* also includes a peer interface 350 configured for receiving host data from storage devices 120 over peer channel 110. Upon entering slave state 352, storage device 120.*n* may configure itself to receive host data transfer messages from storage device 120.1 using source identifier 354. For example, a migration destination notification from storage controller 102 or the initial message through peer channel 110 from storage device 120.1 may indicate storage device 120.1 as the source drive for the data transfer and provide a source identifier 354 that uniquely identifies storage device 120.1 for establishing peer communications. In some embodiments, peer interface 350 may allocate memory locations in storage buffer 356 for receiving host data from storage device 120.1. For example, peer interface 350 may use a data rate for peer channel 110 and the storage protocol being used for the host data transfer to allocate buffer locations corresponding to a defined number of host data units that can be temporarily stored in storage buffer 356 before being committed to the non-volatile storage medium. Storage device 120.1 may control the rate of data transfer and peer interface 350 may use response messages to inform storage device 120.1 of receipt and/or storage of the host data units sent. In some configurations, storage device 120.*n* may achieve ready state 358 when all host data has been received from storage device 120.1. In some configurations, storage device 120.1 may end the data transfer session, identifying to storage device 120.*n* that the host data transfer is complete and it should enter ready state 358 and/or notify storage controller 102 of ready state. In some configurations, storage controller 102 may sent a control message to storage device 120.*n* in response to a queue clear notification from storage device 120.1 to determine ready state and storage device 120.*n* may respond with a ready state message. Once in ready state 358, changeover may end with the hosts being mapped to storage device 120.*n* and host storage operations being directed to storage device 120.*n* going forward as host I/O 360. In some embodiments, storage device 120.*n* may already contain host data and be mapped to one or more hosts prior to the data migration operation and it may process host I/O 360 for its preexisting host data throughout the data transfer process.

Blocks 370-380 show some example control messages that may be sent between storage controller 102 and storage device 120.1 and/or storage device 120.*n* in their respective roles as source and destination drives. At block 370, storage controller 102 may notify storage device 120.1 that it is the source peer data storage device for a host data transfer operation. At block 372, storage controller 102 may notify storage device 120.*n* that it is the destination peer data storage device for the same host data transfer operation. At block 374, storage device 120.1 may send a transfer status message to storage controller 102, such as notification that the original set of host blocks identified and/or a completion threshold portion thereof have been transferred. At block 376, storage controller 102 may send a changeover notification to storage device 120.1 indicating that the changeover has been initiated and storage device 120.1 should attempt to clear its queues within the changeover time window. At block 378, storage device 120.1 may send a queue clear notification to storage controller 102 confirming that the queues have been cleared within the changeover time window. At block 380, storage device 120.*n* may send a read state notification message to storage controller 102 to let the storage controller know that the host data has been stored in non-volatile memory and is ready for host storage operations.

Figure 4:
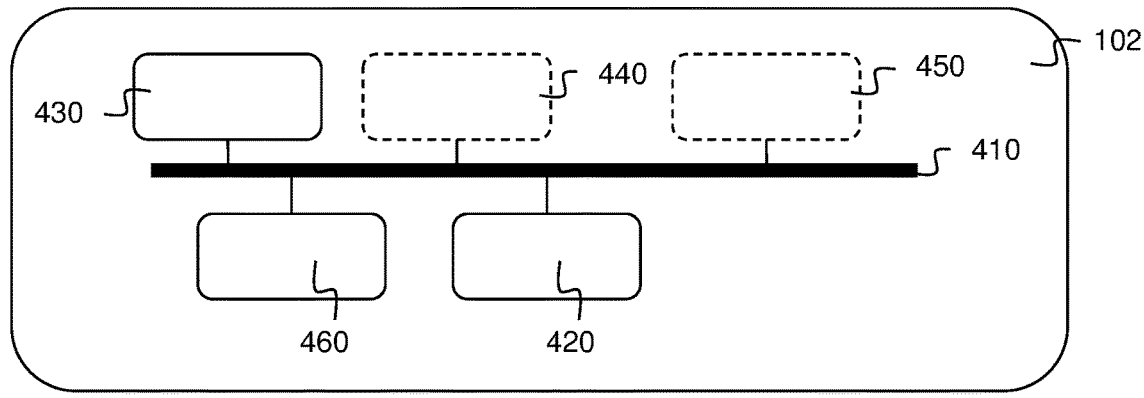
FIG. 4 schematically illustrates a host or storage controller node of the multi-device storage system of FIG. 1.

FIG. 4 shows a schematic representation of an example storage controller 102, host system 154, or similar system node. Storage controller 102 may comprise a bus 410, a processor 420, a local memory 430, one or more optional input units 440, one or more optional output units 450, and a communication interface 460. Bus 410 may include one or more conductors that permit communication among the components of storage controller 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to storage controller 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables storage controller 102 to communicate with other devices and/or systems. In some embodiments, communication interface 460 may include one or more peripheral interfaces, such as a PCIe interface for connecting to storage devices 120 as a host storage interface. In some embodiments, communication interface 460 for storage controller 102 may connect to peer channel 110 for limited control communications related to managing peer transfers of host data.

Figure 5:
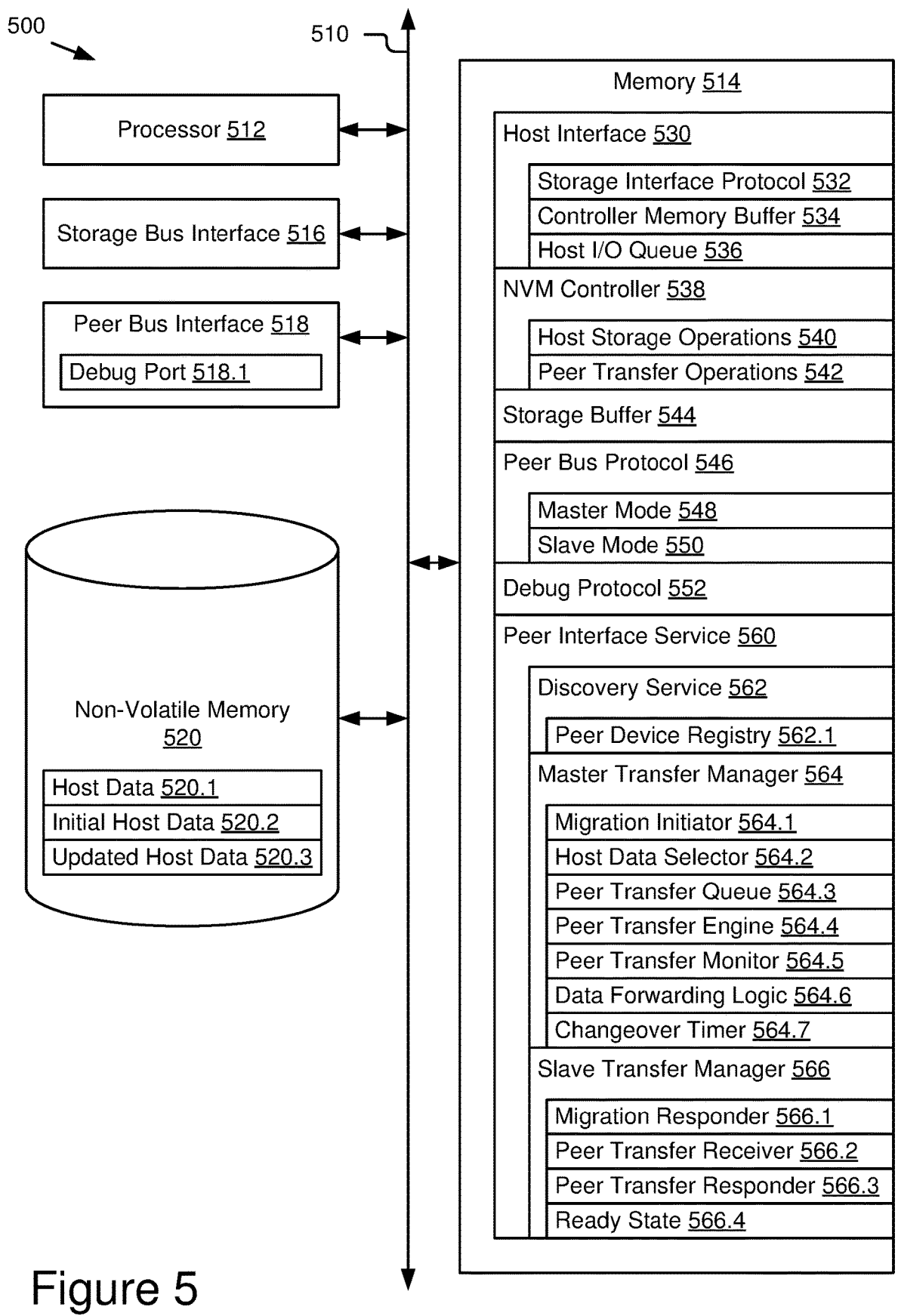
FIG. 5 schematically illustrates some elements of the data storage devices of FIG. 1-3 in more detail.

FIG. 5 schematically shows selected modules of a storage device 500 configured for peer transfer of host data through a physically separate peer channel, such as storage devices 120. Storage device 500 may incorporate elements and configurations similar to those shown in FIGS. 1-3. For example, storage device 500 may be configured as a storage device 120 in a set of peer storage devices interconnected by a peer bus and including a host storage bus interface for data transfer to and from a host in a multi-device data storage system.

Storage device 500 may include a bus 510 interconnecting at least one processor 512, at least one memory 514, and at least two physical interfaces, such as storage bus interface 516 and peer bus interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disc or a solid state storage element.

Storage bus interface 516 may include a physical interface for connecting to a host using an interface protocol that supports storage device access. For example, storage bus interface 516 may include a PCIe, SATA, SAS, or similar storage interface connector supporting NVMe access to solid state media comprising non-volatile memory devices 520. Peer bus interface 518 may include a physical interface for connecting to a secondary bus used for peer communication without relying on host interface resources or storage bus interface 516. For example, peer bus interface 518 may include a separate physical interface of 2, 4, or 8 lanes supporting physical and link protocols for packetized master/slave communication between two peer storage devices via a corresponding set of peer bus wires. In some configurations, a debug port 518.1 may be configured on storage device 500 using HSSTP protocols and specifications. Debug port 518.1 may be configured using a debug protocol for communication between a debug system and storage device 500 during manufacture, configuration, and/or troubleshooting of storage device 500 and may be switched to support peer-to-peer communication in production environments, such as when deployed in a multi-device storage system. For example, when deployed, debug protocol 552 may be disabled and peer interface service 560 may be enabled to use debug port 518.1 as peer bus interface 518.

Storage device 500 may include one or more non-volatile memory devices 520 configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells.

Storage device 500 may include a plurality of modules or subsystems that are stored and/or instantiated in memory 514 for execution by processor 512 as instructions or operations. For example, memory 514 may include a host interface 530 configured to receive, process, and respond to host storage requests from client or host systems. Memory 514 may include a non-volatile memory (NVM) controller 538 configured to manage read and write operations to non-volatile memory devices 520. Memory 514 may include a storage buffer 544 for temporarily storing data being written to or read from non-volatile memory 520. Memory 514 may include a peer bus protocol 546 configured manage communication over peer bus interface 518 in accordance with a determined protocol, standard, and/or proprietary syntax and command set. Memory 514 may include a debug protocol 552 configured to manage communication with a debug system or application used during manufacturing and troubleshooting. Memory 514 may include a peer interface service 560 configured for communication among storage devices attached to the same peer bus as storage device 500.

Host interface 530 may include an interface protocol and/or set of functions and parameters for receiving, parsing, responding to, and otherwise managing host data requests from a host. For example, host interface 530 may include functions for receiving and processing host storage requests for reading, writing, modifying, or otherwise manipulating data blocks and their respective client or host data and/or metadata in accordance with host communication and storage protocols. In some embodiments, host interface 530 may enable direct memory access and/or access over NVMe protocols through storage bus interface 516 to host data units 520.1 stored in non-volatile memory devices 520. For example, host interface 530 may include host communication protocols compatible with PCIe, SATA, SAS, and/or another bus interface that supports use of NVMe protocols for data access to host data 520.1.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage bus interface 516. For example, storage interface protocol 532 may include both PCIe and NVMe compliant communication, command, and syntax functions, procedures, and data structures. Host interface 530 may include a controller memory buffer 534 configured for direct memory access by the storage controller and/or one or more hosts. For example, controller memory buffer 534 may be used for host data transfer and offloading one or more host interface queues to data storage device 500. Some configurations may use host direct memory access to controller memory buffer 534 to improve host data transfer rates and optimize host storage interface resources. Host interface 530 may include host I/O queues 536 configured for receiving and responding to host storage requests. For example, host I/O queues 536 may be mapped to specific hosts, receive storage requests, and store them as pending storage operations in host I/O queues 536. In some configurations, host interface 530 may include host I/O queues 536 that are not directly accessible to the host and may require the host interface to parse a host storage command to populate corresponding storage operations in internal host I/O queues until they can be processed by NVM controller 538. In some embodiments, host interface 530 may include additional modules (not shown) for command handling, buffer management, storage device management and reporting, and other host-side functions.

NVM controller 538 may include an interface protocol and/or set of functions and parameters for reading, writing, and deleting data units in non-volatile memory devices 520. For example, host interface 530 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 538 may include flash translation layer (FTL) management, data state machine, read/write buffer management (for storage buffer 544), NVM device interface protocols, NVM device configuration/management/maintenance, and other device-side functions.

In some embodiments, NVM controller 538 may provide the device side processing for storage operations associated with different interfaces and communication channels. For example, NVM controller 538 may process host storage operations 540 based on host storage requests received through host interface 530 and may process peer transfer operations 542 based on transfer messages for peer interface service 560 and the corresponding peer communication channel. In some embodiments, host storage operations 540 may be received through host I/O queues 536 and host data may be transferred to the host using controller memory buffer 534. Host storage operations 540 may or may not use storage buffer 544 as temporary storage between host interface 530 and non-volatile memory 520. Peer interface service 560 may use storage buffer 544 for staging host data being transferred or received through the peer communication channel and peer transfer operations 542 may move host data between storage buffer 544 and non-volatile memory 520.

Storage buffer 544 may be a set of volatile memory devices within data storage device 500 for temporarily storing (buffering) data between non-volatile memory 520 and one or more interfaces. Storage buffer 544 may include a plurality of memory locations corresponding to host data unit sizes and/or NVM page sizes and may be used for buffering host data units to match physical program/erase units (going to the media) and/or buffering read data units to match host data units and/or data transfer units. In some embodiments, peer interface service 560 may read transfer data units read into storage buffer 544 by NVM controller 538 for transferring host data to a peer data storage device and may temporarily store transfer data units into storage buffer 544 as they are received from a peer data storage device (prior to NVM controller 538 moving the transferred data into non-volatile memory 520).

Peer bus protocol 546 may include interfaces, functions, and parameters for communication through peer bus interface 518 to a peer bus providing a peer channel to a similar interface on a peer data storage device. Peer bus protocol 546 may be based on a physical configuration that takes up limited space in data storage device 500, such as a 2, 4, 8, or 10 lane physical interface supported by a transport layer that supports packet-based master/slave communication. For example, storage device 500 may include a small footprint (8 or fewer lanes) PCIe interface or an HSSTP-compliant debug interface and use corresponding physical specifications and transport protocols. Debug port 518.1 may provide a multipin interface for a number of signal connections, including two or more pins for data I/O. Peer bus protocol 546 may use the data I/O pins to establish physical and transport layer connections between peer data storage devices attached to the same peer bus. A storage application protocol with a limited command set for facilitating point-to-point data transfer may be layered on top of the peer bus physical and transport layers. For example, command sets for transport, identification/discovery, and data integrity for host data payloads may be derived from common protocols supporting data transfer, such as PCIe, NVMe, universal serial bus (USB), internet protocols, etc. and/or may be based on proprietary command sets. In some embodiments, peer bus protocol 546 may be based on a master/slave model for unidirectional data transfer. For example, the source peer data storage device may use a master mode 548 to control data transfer over the peer bus and prioritize transfer of host data payloads with only period return messages for data integrity purposes. The destination peer data storage device may operate in a slave mode 550 to enable the source peer data storage device to maximize use of the peer bus for host data transfer. Data storage device 500 and each other peer data storage device may operate in master mode 548 or slave mode 550 as needed for their role in a host data migration.

Debug protocol 552 may include interfaces, functions, and parameters for using debug port 518.1 to interface with a debugger system and/or debugger application in a manufacturing and/or troubleshooting environment. Debug protocol 552 may not be enabled during normal operation of storage device 500 and may not include the routine system logging for trace and debug data generated during drive operation and managed through NVM controller firmware and host and/or control data interfaces. Debug protocol 552 may be selectively enabled and disabled depending on whether debug port 518.1 is connected to an appropriate debugger interface. In some configurations, debug port 518.1 may be switched between a debug mode and a peer bus interface mode based on a configuration setting, a state detected from one or more pins of the port, and/or a physical switch.

Peer interface service 560 may include an interface protocol and set of functions and parameters for discovering peer storage devices, sending and receiving messages with those peer storage devices, and/or transferring host data between those peer storage devices. For example, peer interface service 560 may include functions for utilizing a secondary physical bus through peer bus interface 518 using peer bus protocol 546. In some embodiments, peer interface service 560 may use master mode 548 to transfer of host data 520.1 from non-volatile memory devices 520 to the non-volatile memory devices of other peer storage devices and/or use slave mode 550 to receive host data 520.1 from the non-volatile memory devices of other peer storage devices through the peer channel.

In some embodiments, peer interface service 560 may include a plurality of hardware and/or software modules configured to use processor 512 and memory 514 to handle or manage defined operations of peer interface service 560. For example, peer interface service 560 may include a discovery service 562, master transfer manager 564, and/or a slave transfer manager 566. For example, discovery service 562 may be configured to discover peer storage devices on a shared peer bus and store their addresses for use by master transfer manager 564 and/or slave transfer manager 566. When storage device 500 is designated as the source peer data storage device, master transfer manager 564 may be configured to manage the transfer of host data 520.1 from non-volatile memory 520 to a destination peer data storage device. When storage device 500 is designated as the destination peer data storage device, slave transfer manager 566 may be configured to receive the transfer of host data 520.1 from the source peer data storage device.

Discovery service 562 may include data structures, functions, and interfaces for discovering peer devices on a peer bus and determining peer device addresses for use by peer interface service 560. For example, during initialization or startup of storage device 500, discovery service 562 may broadcast its device identifier or address and receive similar broadcasts from other devices to accumulate device information for other devices on the peer bus. In some embodiments, discovery service 562 may include a peer device registry 562.1 configured to store storage device identifiers, peer bus addresses, and/or other peer storage device information to establish and support communication with peer storage devices. For example, peer device registry 562.1 may include a data table or other data structure in memory 514 that includes a plurality of device identifier entries associated with corresponding peer bus addresses. In some embodiments, discovery service 562 may include a device ID broadcaster/receiver configured to determine the storage device identifier and/or peer bus address for storage device 500, broadcast a message on the peer bus to enable other devices on the peer bus to discover storage device 500, and/or receive a message on the peer bus from other devices including their storage device identifiers and/or peer bus addresses. Peer bus protocol 546 may define syntax for broadcast messages, such as a broadcast address, a tag or similar parameter for designating a discovery broadcast, and data payload including the storage device identifier, peer bus address, vendor identifier, etc. In some embodiments, peer device registry 562.1 may be configured by a storage controller or system administrator and stored to storage device 500 without requiring discovery messages to be sent by storage device 500 on the peer bus.

Master transfer manager 564 may include data structures, functions, and interfaces for sending and receiving messages to and from a slave data storage device over the peer bus. For example, master transfer manager 564 may implement peer bus protocol 546 to send and receive messages with the destination data storage device and, more particularly, to transfer host data 520.1 in a series of data transfer messages that include host data units in the message payload and receive confirmation messages back from the destination storage device. In some configurations, master transfer manager 564 may be initiated in response to a migration source notification from a storage controller. Migration initiator 564.1 may be configured to receive the migration source notification and use peer bus protocol 546 to enter master mode 548 for controlling peer communications over the peer bus. Migration initiator 564.1 may also may also be configured to identify a peer storage device identifier for the destination storage device from peer device registry 562.1 and determine the corresponding address on the peer bus. In some embodiments, migration initiator 564.1 may send a handshake message or similar initial message to the destination storage device to establish peer communication and ensure that the destination storage device is in slave mode 550 and ready to receive the data transfer from master transfer manager 564.

In some embodiments, master transfer manager 564 may include a host data selector 564.2 configured to select the set of host data from host data 520.1 for the host data migration operation. For example, host data selector 564.2 (and/or migration initiator 564.1) may determine the scope of the host data transfer from the migration source notification, such as all host data 520.1 or a subset thereof (such as for a specific host, namespace, set of dies, etc.). In some configurations, the set of host data currently stored in non-volatile memory 520 when the migration operation is initiated (e.g., when the migration source notification is received) may be referred to as initial host data 520.2. Host data selector 564.2 may use initial host data 520.2 to populate a peer transfer queue 564.3 with a series of read operations for NVM controller 538 to move host data into storage buffer 544 for transfer by peer transfer engine 564.4. Peer transfer engine 564.4 may be configured to select host data units from storage buffer 544, configure them in the payload of transfer messages complying with peer bus protocol 546, and send them through peer bus interface 518 to the peer bus address for the destination storage device. Peer transfer monitor 564.5 may monitor response messages from the destination storage device over the peer bus to determine successful transfer and storage of the host data units sent.

In some embodiments, storage device 500 may continue to receive and execute host storage operations through host interface 530 during the host data migration operation through the peer channel. Data forwarding logic 564.6 may determine the impact of new host storage operations (e.g., operations that occur during the time period of the host data migration operation) on the host data being transferred. For example, data forwarding logic 564.6 may determine host data units that are written to storage device 500, including modifications of previously stored host data units, and may identify the new host data as updated host data 520.3. Data forwarding logic 564.6 may add updated host data 520.3 to peer transfer queue 564.3 as it is received and/or processed from host I/O queue 536. In some configurations, data forwarding logic may not address host data units invalidated by ongoing host storage operations, including delete operations, and may allow those data units to be transferred by peer transfer engine 564.4 from peer transfer queue 564.3. In some embodiments, the invalidated host data units may be handled by the storage controller during the changeover process.

The host data migration operation may include a changeover window during which the storage controller ensures that the host data has been transferred and there are no pending operations before changing over host connections from the source storage device to the destination storage device. In some configurations, master transfer manager 564 may receive notification of the changeover window from the storage controller. Host storage operations to host data 520.1 may be paused and storage device 500 may use the changeover window to clear both peer transfer queue 564.3 and host I/O queue 536. In some configurations, peer transfer monitor 564.5 may be configured to update the storage controller of the progress of the host data transfer at periodic intervals (based on time or host data units transferred) or when one or more transfer thresholds are reached, such as completing the transfer of initial host data 520.2, peer transfer queue 564.3 falling below a defined queue depth, and/or a threshold amount of host data transferred or data remaining. The storage controller may use the progress updates from peer transfer monitor 564.5 to determine when it initiates the changeover process as described above with regard to FIGS. 2 and 3. In some configurations, master transfer manager 564 may include a changeover timer 564.7 configured to monitor the elapsed time in the changeover time window and determine whether the queues are cleared within the changeover time window. If so, master transfer manager 564 may send a queues clear notification to the storage controller. If the elapsed time exceeds the changeover time window, master transfer manager 564 may send a changeover failure notification to the storage controller.

Slave transfer manager 566 may include data structures, functions, and interfaces for receiving messages from a master data storage device over the peer bus, as well as sending response messages. For example, slave transfer manager 566 may implement peer bus protocol 546 to receive and send messages with the source data storage device and, more particularly, to receive host data 520.1 in a series of data transfer messages that include host data units in the message payload and send confirmation messages back to the source storage device. In some configurations, slave transfer manager 566 may be initiated in response to a migration destination notification from a storage controller. Migration responder 566.1 may be configured to receive the migration destination notification and use peer bus protocol 546 to enter slave mode 550 for receiving peer communications over the peer bus from the source storage device in master mode 548. Migration responder 566.1 may also may also be configured to identify a peer storage device identifier for the source storage device from peer device registry 562.1 and determine the corresponding address on the peer bus. In some embodiments, migration responder 566.1 may receive a handshake message or similar initial message from the destination storage device to establish peer communication. In some embodiments, the migration destination notification and/or the initial message(s) from the source storage device may include parameters describing the host data set to be migrated, such as the memory size of the host data and/or the host data unit and/or data transfer configuration. In some configurations, migration responder 566.1 may allocate memory space in storage buffer 544 for receiving the host data.

Slave transfer manager 566 may include a peer transfer receiver 566.2 configured to receive the series of data transfer messages for transferring host data 520.1 to storage device 500. For example, peer transfer receiver 566.2 may use peer bus protocol 546 to receive and parse data transfer messages and store the host data units from the payload in storage buffer 544, from which NVM controller 538 may move the host data units into non-volatile memory 520. Slave transfer manager 566 may include a peer transfer responder 566.3 configured to send response messages to the source storage device. For example, each time a host data unit is successfully received and stored, peer transfer responder 566.3 may send a confirmation message for use by the peer transfer monitor of the source storage device. In some configurations, slave transfer manager 566 may have no other role in monitoring the progress of the transfer and, when the transfer is complete (from the source storage device's perspective), the host data migration operation may end. For example, after the last host data unit has been transferred and the source storage device has received all confirmation messages, a notification terminating the peer data transfer may be received by slave transfer manager 566. Once the host data transfer is complete, slave transfer manager 566 may indicate that a ready state 566.4 has been achieved for the transferred host data and the corresponding hosts may be mapped to the destination storage device for host storage operations going forward. In some embodiments, slave transfer manager 566 may send a notification of ready state to the storage controller and/or the source storage device.

Figure 6:
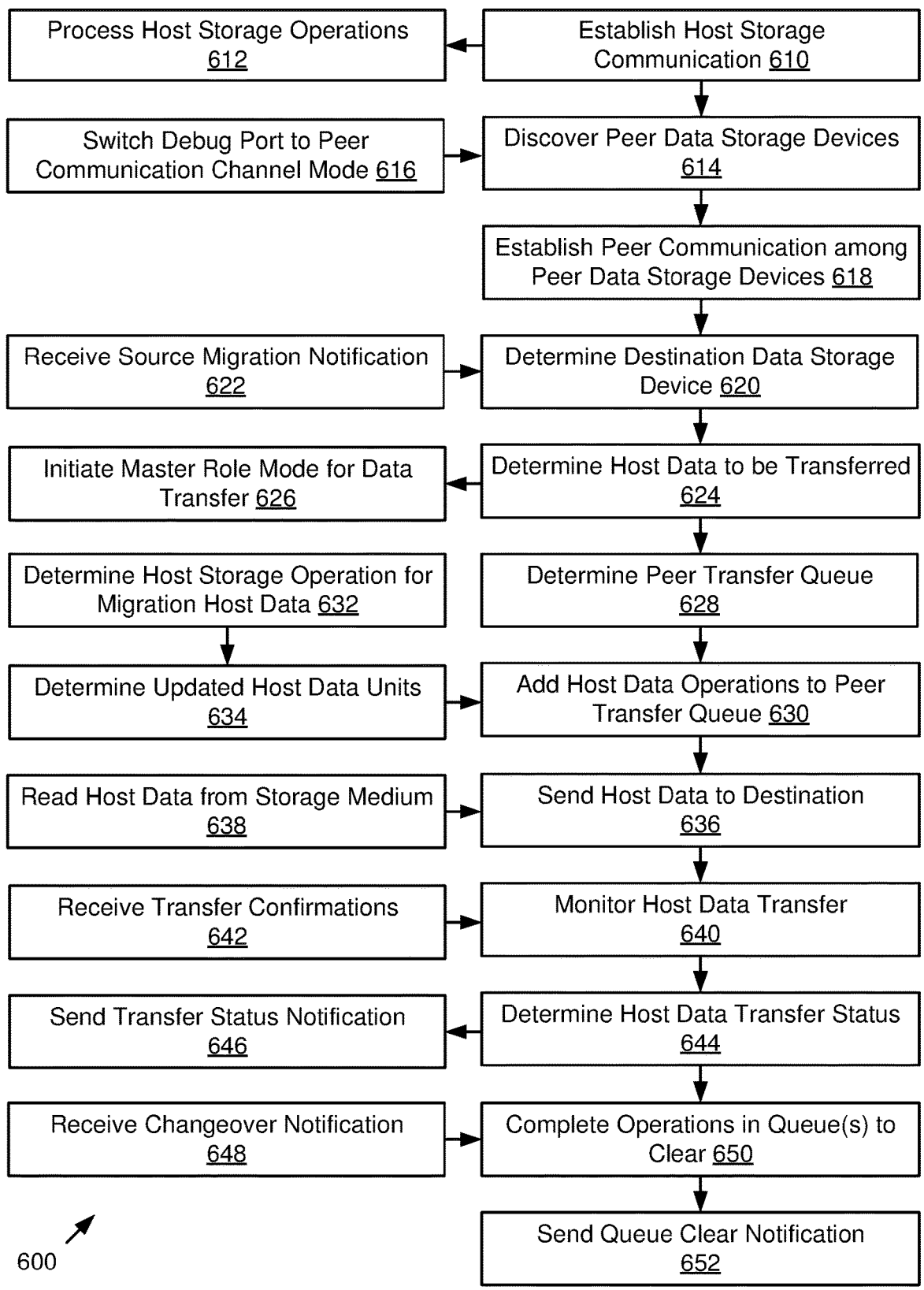
FIG. 6 is a flowchart of an example method of migrating host data from a source peer data storage device.

As shown in FIG. 6, storage device 500 may be operated according to an example method for migrating host data from a source peer data storage device, i.e., according to method 600 illustrated by blocks 610-652 in FIG. 6.

At block 610, host storage communication may be established. For example, a data storage device may establish communication with one or more hosts over a host storage bus using a storage protocol shared by the host and the data storage device.

At block 612, host storage operations may be processed. For example, the data storage device may receive host storage commands or requests through the host interface and process them using a controller memory buffer and one or more host I/O queues.

At block 614, peer data storage devices may be discovered. For example, the data storage device may include a second physical interface connected to a peer bus and discover a set of peer data storage devices connected to the same peer bus.

At block 616, a debug port may be switched to a peer communication channel mode. For example, in some embodiments, the second physical interface may be a debug port used during manufacturing that may be switched, prior to block 614, to use the same physical interface and/or low-level protocols overlaid with a storage protocol for peer-to-peer data transfers.

At block 618, peer communication may be established among peer data storage devices. For example, the data storage device may determine the peer bus addresses for communicating with each other peer storage device connected to the same peer bus.

At block 620, a destination data storage device may be determined. For example, the data storage device may determine a storage device identifier and corresponding peer bus address for a peer storage device designated as the destination storage device for a host data migration.

At block 622, a source migration notification may be received. For example, in some embodiments, prior to block 620, the data storage device may receive a migration notification specifying the data storage device as the source and another peer storage device as the destination.

At block 624, host data to be transferred may be determined. For example, the data storage device may determine some or all of the host data stored in its non-volatile memory is to be transferred to the destination storage device. In some embodiments, the scope of the host data to be transferred may be included as a parameter of the source migration notification at block 622.

At block 626, a master role mode may be initiated for the data transfer. For example, in some embodiments, the data storage device may initiate a master mode for controlling peer bus communications during the host data transfer.

At block 628, a peer transfer queue may be determined. For example, the data storage device may initialize a peer transfer queue for host transfer operations.

At block 630, host data operations may be added to the peer transfer queue. For example, host transfer operations for reading host data from the non-volatile memory to a storage buffer may be added to the peer transfer queue for each host data unit in the set of host data to be migrated.

At block 632, a host storage operation targeting the host data to be migrated may be determined. For example, in some configurations, the data storage device may continue to receive and process host storage operations that target host data stored in non-volatile memory and identified at block 624 for transfer.

At block 634, updated host data units may be determined. For example, in some configurations, the data storage device may process the host storage operations to store new or updated host data to the non-volatile memory and that updated host data that also needs to be transferred as part of the migration operation.

At block 636, host data may be sent to the destination storage device over the peer channel. For example, the data storage device may use the peer bus protocol to send data transfer messages including host data units as payload to the destination storage device.

At block 638, host data may be read from the storage medium. For example, in some configurations, the data storage device may read the host data units from the non-volatile memory to a storage buffer and the host data units may be read from the storage buffer to package them for data transfer.

At block 640, host data transfer may be monitored. For example, the data storage device may track the progress of the host data transfer, such as how many host data units have been transferred and how many remain in the peer transfer queue.

At block 642, transfer confirmations may be received. For example, in some embodiments, the data storage device may receive response messages from the destination storage device over the peer communication channel to confirm successful transfer and storage of each host data unit.

At block 644, host data transfer status may be determined. For example, the data storage device may track progress of the host data transfer against one or more thresholds, such as amount of data transferred, amount remaining to be transferred, etc.

At block 646, a transfer status notification may be sent. For example, the data storage device may send periodic and/or threshold-based notifications to a storage controller based on transfer status determined at block 644, which may include a transfer complete notification with all data in the initial host data set identified at block 624 has been successfully transferred.

At block 648, a changeover notification may be received. For example, the data storage device may receive a notification from the storage controller that a changeover window has been initiated and host storage operations to the host data have been paused.

At block 650, pending operations in the queues may be cleared. For example, during the changeover window, the data storage device may process all pending host storage operations in the host I/O queue and all pending data transfer operations in the peer transfer queue.

At block 652, a queue clear notification may be sent. For example, the data storage device may send a notification to the storage controller that all queues have been cleared within the changeover window.

Figure 7:
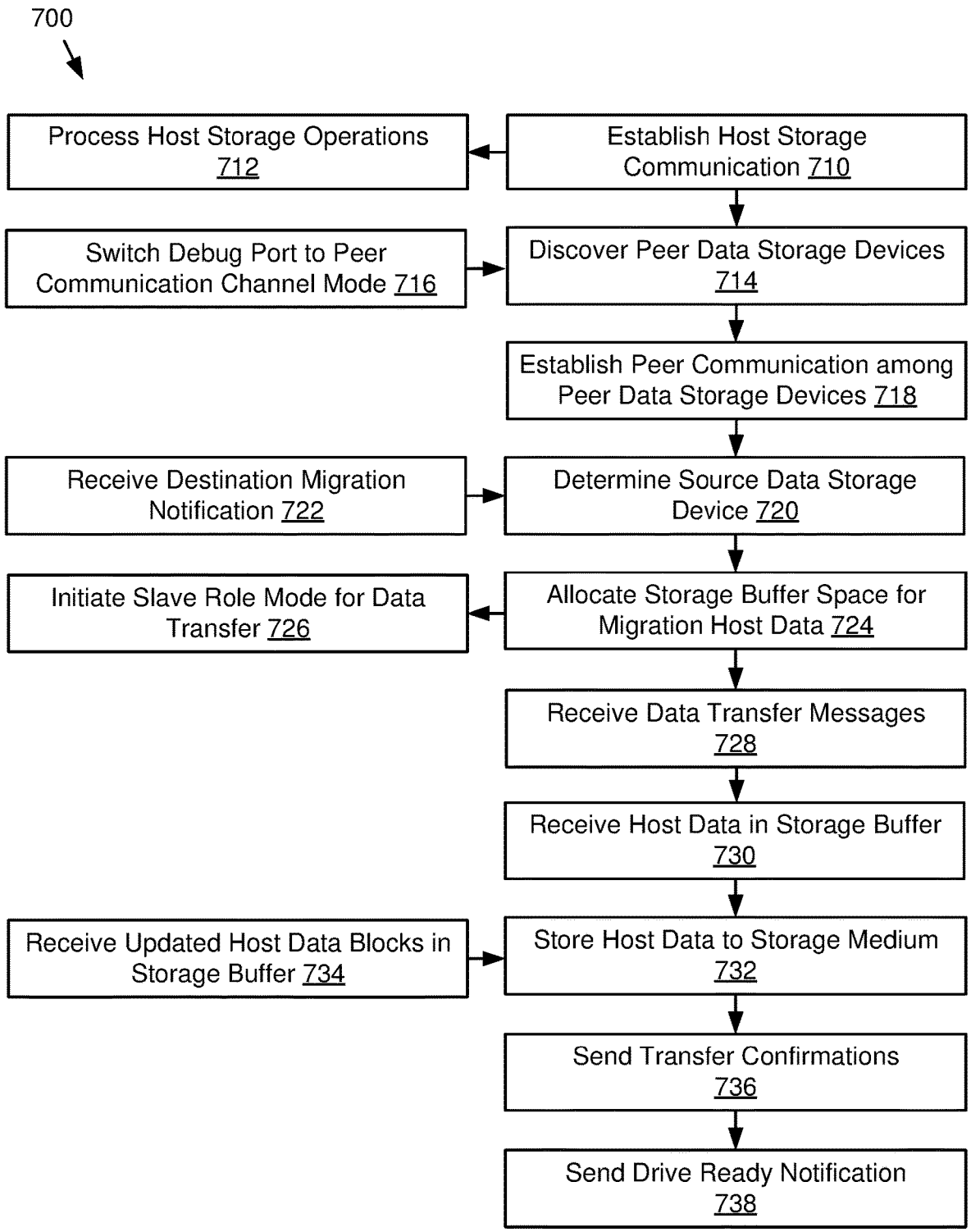
FIG. 7 is a flowchart of an example method of migrating host data to a destination peer data storage device.

As shown in FIG. 7, storage device 500 may be operated according to an example method for migrating host data to a destination peer data storage device, i.e., according to method 700 illustrated by blocks 710-738 in FIG. 7.

At block 710, host storage communication may be established. For example, a data storage device may establish communication with one or more hosts over a host storage bus using a storage protocol shared by the host and the data storage device.

At block 712, host storage operations may be processed. For example, the data storage device may receive host storage commands or requests through the host interface and process them using a controller memory buffer and one or more host I/O queues.

At block 714, peer data storage devices may be discovered. For example, the data storage device may include a second physical interface connected to a peer bus and discover a set of peer data storage devices connected to the same peer bus.

At block 716, a debug port may be switched to a peer communication channel mode. For example, in some embodiments, the second physical interface may be a debug port used during manufacturing that may be switched, prior to block 714, to use the same physical interface and/or low-level protocols overlaid with a storage protocol for peer-to-peer data transfers.

At block 718, peer communication may be established among peer data storage devices. For example, the data storage device may determine the peer bus addresses for communicating with each other peer storage device connected to the same peer bus.

At block 720, a source data storage device may be determined. For example, the data storage device may determine a storage device identifier and corresponding peer bus address for a peer storage device designated as the source storage device for a host data migration.

At block 722, a destination migration notification may be received. For example, in some embodiments, prior to block 720, the data storage device may receive a migration notification specifying the data storage device as the destination and another peer storage device as the source.

At block 724, storage buffer space may be allocated for migration of host data. For example, the data storage device may allocate a set of memory locations in the storage buffer for receiving host data from the source storage device.

At block 726, a slave role mode may be initiated for the data transfer. For example, in some embodiments, the data storage device may initiate a slave mode for receiving peer bus communications during the host data transfer.

At block 728, data transfer messages may be received. For example, the data storage device may receive data transfer messages over the peer bus that include host data as the payload.

At block 730, host data may be received in the storage buffer. For example, the data storage device may parse host data transfer messages and move the host data in the payload of those messages into the storage buffer.

At block 732, host data may be stored to the storage medium. For example, the data storage device may store host data units from the storage buffer into non-volatile memory.

At block 734, updated host data blocks may be received in the storage buffer. For example, the data storage device may receive host data transfer messages over the peer bus for host data units that have been modified since the host data transfer began and these updated host data blocks may also be stored to the storage medium at block 732.

At block 736, transfer confirmations may be sent. For example, the data storage device may send response messages to confirm receipt and storage of the host data units in the data transfer messages.

At block 738, a drive ready notification may be sent. For example, the data storage device may determine that the host data transfer is complete and the host data is stored in non-volatile memory for supporting host storage operations going forward, then provide a notification to the source storage device and/or the storage controller notifying them of the ready state.

Figure 8:
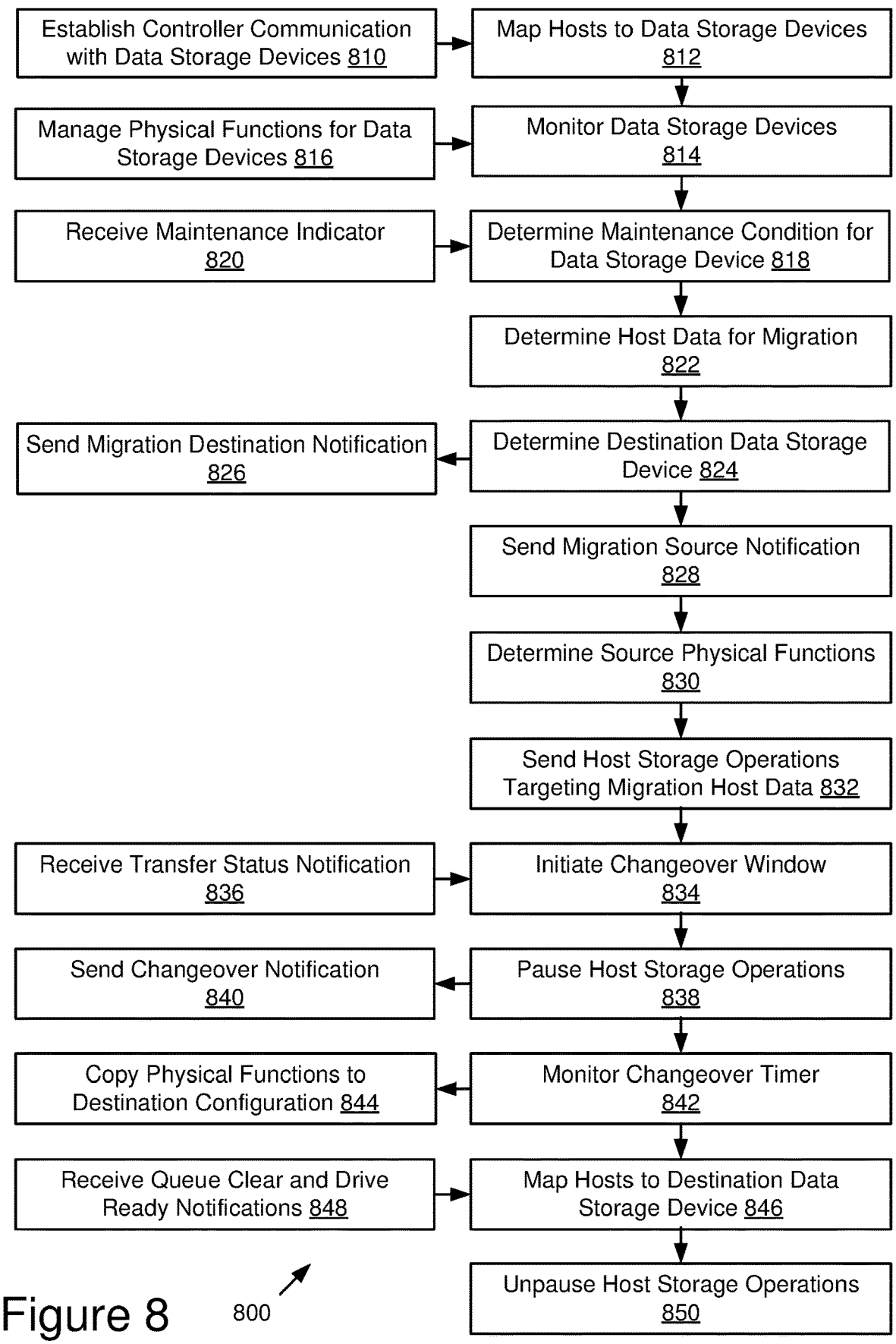
FIG. 8 is a flowchart of an example method of managing a host data migration by a storage controller.

As shown in FIG. 8, storage controller 102 may be operated according to an example method for managing a host data migration, i.e., according to method 800 illustrated by blocks 810-850 in FIG. 8.

At block 810, controller communication may be established with a set of data storage devices. For example, the storage controller may include one or more interface connections to a peer group of data storage devices that it manages.

At block 812, hosts may be mapped to data storage devices. For example, the storage controller may receive host connection requests and map them to specific data storage devices in the group.

At block 814, data storage devices may be monitored. For example, the storage controller may monitor health states, usage/wear metrics, and other parameters for managing the data storage devices.

At block 816, physical functions may be managed for the data storage devices. For example, in some embodiments, the storage controller may manage physical function states, including host LBA tables, device specifications and configurations, queue allocations, and other host-side storage device management features.

At block 818, a maintenance condition may be determined for a data storage device. For example, the storage controller may determine, based on the health states or other information, that a data storage device is in need of maintenance and should be relieved of some or all of its host storage operations to perform that maintenance.

At block 820, a maintenance indicator may be received. For example, in some embodiments, the storage controller may receive an indicator from a system administrator or another system component, such as storage system maintenance planning application, that a data storage device has a maintenance condition and is due for replacement or other maintenance.

At block 822, host data for migration may be determined. For example, in some embodiments, the storage controller may determine from the maintenance condition whether some or all of the host data in the data storage device needs to be migrated, making the data storage device the source device for a data migration.

At block 824, a destination data storage device may be determined. For example, the storage controller may select a data storage device from the group that has the capacity (both storage and processing) to service the host data determined at block 822.

At block 826, a migration destination notification may be sent. For example, in some embodiments, the storage controller may send a migration notification to the destination storage device determined at block 824.

At block 828, a migration source notification may be sent. For example, the storage controller may send a migration notification to the source storage device determined at blocks 818 and 822.

At block 830, a set of source physical functions may be determined. For example, the storage controller may determine the set of physical function states that correspond to the host data being transferred and designate a configuration for supporting the host storage operations targeting that host data.

At block 832, host storage operations targeting the migration host data may be sent. For example, during the initial host data transfer operation, the source storage device may execute a peer-to-peer migration of host data while continuing to support new host storage operations targeting those host data units and the storage controller may continue to send corresponding host storage operations to the source storage device.

At block 834, a changeover window may be initiated. For example, following an initial data migration window, the storage controller may determine that a changeover should be attempted to complete the host migration from the source storage device to the destination storage device.

At block 836, a transfer status notification may be received. For example, in some embodiments, the storage controller may receive host data transfer status messages from the source storage device and may use the status messages to determine a completion threshold for ending the initial migration window and initiating the changeover window at block 834.

At block 838, host storage operations may be paused. For example, the storage controller may pause the host storage operations targeting the migration set of host data.

At block 840, a changeover notification may be sent. For example, in some embodiments, the storage controller may send a notification message to the source storage device indicating the start of the changeover window.

At block 842, changeover time may be monitored. For example, the storage controller may monitor an elapsed time since the start of the changeover window to monitor whether the changeover is complete within a configured changeover time threshold.

At block 844, physical functions may be copied to the destination storage device configuration. For example, in some embodiments, the storage controller may copy the configuration determined at block 830 to associate the physical function states with the destination storage device.

At block 846, hosts may be mapped to the destination data storage device. For example, the storage controller may map the destination storage device to the hosts associated with the migrated host data.

At block 848, queue clear and drive ready notifications may be received. For example, in some embodiments, the storage controller may receive notifications from the source storage device and/or the destination storage device indicating that the host data transfer is complete and the destination storage device is ready to take over processing corresponding host storage operations.

At block 850, host storage operations may be unpaused. For example, the storage controller may resume forwarding host storage operations targeting the migrated host data, but now to the destination storage device instead of the source storage device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   a first data storage device comprising:
   a processor;
   a memory;
   a non-volatile storage medium configured to store host data;
   a host interface configured to connect to at least one host system;
   a peer interface configured to connect to a peer communication channel, wherein:

a plurality of peer data storage devices is configured to connect to the peer communication channel; and the host interface and the peer interface comprise separate physical interfaces; and a peer interface service configured to:
  establish, through the peer communication channel, peer communication with a target peer data storage device from the plurality of peer data storage devices;
  determine a set of host data blocks from the non-volatile storage medium;
  determine a peer transfer queue;
  add the set of host data blocks to the peer transfer queue;
  send, through the peer communication channel, the set of host data blocks to the target peer data storage device;
  monitor transfer of the set of host data blocks over the peer communication channel; and
  determine whether the set of host data blocks have been successfully transferred to the target peer data storage device.

2. The system of claim 1, wherein:
the first data storage device further comprises:
  a storage interface protocol configured for communication with the host system through the host interface;
  a controller memory buffer accessible to the at least one host system through the host interface;
  a non-volatile memory device controller configured to manage data input/output to the non-volatile storage medium; and
  a storage buffer, controlled by the non-volatile memory device controller, configured to temporarily store data input/output to the non-volatile storage medium; and
the peer interface service is further configured to send the set of host data blocks through the peer communication channel from the storage buffer to the target peer data storage device.

3. The system of claim 2, further comprising:
the target peer data storage device comprising:
  a target non-volatile storage medium configured to store host data;
  a target peer interface configured to connect to the peer communication channel;
  a target non-volatile memory device controller configured to manage data input/output to the target non-volatile storage medium; and
  a target storage buffer, controlled by the target non-volatile memory device controller, configured to:
    temporarily store data input/output to the target non-volatile storage medium; and
    receive, through the peer communication channel, the set of host data blocks from the first data storage device.

4. The system of claim 2, wherein:
the host interface comprises a first storage interface protocol;
the peer interface comprises a second storage interface protocol; and
the non-volatile memory device controller is further configured to process, based on the first storage interface protocol and using the controller memory buffer, host data storage operations in parallel with the peer interface service sending the set of host data blocks to the target peer data storage device.

5. The system of claim 4, wherein:
the peer interface service is further configured to initiate, using the second storage interface protocol, a master mode prior to sending the set of host data blocks; and
the target peer data storage device is configured, using the second storage interface protocol, to initiate a slave mode prior to receiving the set of host data blocks.

6. The system of claim 1, wherein the peer interface comprises a physical debug port and is further configured to switch between a debug mode and a peer communication channel mode.

7. The system of claim 6, wherein:
during the debug mode, the physical debug port is configured to receive debug commands using a debug protocol that is different than a storage interface protocol configured for communication with the host system through the host interface; and
during the peer communication channel mode, the first data storage device is configured to disable the debug protocol.

8. The system of claim 1, wherein the peer interface service is further configured to:
determine host storage operations targeting the set of host data blocks;
add, responsive to the host storage operations targeting the set of host data blocks, updated host data blocks to the peer transfer queue;
receive, from a storage controller, a changeover notification;
complete, during a changeover time period, transfer of the updated host data blocks in the peer transfer queue; and
send, to the storage controller and responsive to completion of the transfer of the updated host data blocks in the peer transfer queue, a queues clear notification.

9. The system of claim 1, further comprising:
a storage controller comprising:
  a controller processor;
  a controller memory; and
  a drive manager configured to:
    determine a maintenance condition of the first data storage device;
    determine the set of host data blocks;
    determine the target peer data storage device from the plurality of peer data storage devices;
    send a migration source notification to the first data storage device; and
    send a migration destination notification to the target peer data storage device.

10. The system of claim 9, wherein the drive manager is further configured to:
determine a set of physical functions corresponding to the set of host data blocks;
send, during a migration window, host storage operations targeting the set of host data blocks to the first data storage device;
receive, from the first data storage device, a transfer complete notification;
initiate a changeover window;
during the changeover window:
  pause host storage operations targeting the set of host data blocks;
  copy the set of physical functions from a first configuration for the first data storage device to a second configuration for the target peer data storage device; and map the target peer data storage device to the at least one host system for the set of host data blocks; and initiate a maintenance operation for the first data storage device.

11. A computer-implemented method, comprising:

receiving, during a debug mode and through a physical debug port of a first data storage device, debug commands using a debug protocol;

disabling, during a peer communication channel mode, the debug protocol for the physical debug port;

establishing, from the first data storage device and through the physical debug port, peer communication with a target peer data storage device from a plurality of peer data storage devices, wherein:

each data storage device of the first data storage device and the plurality of peer data storage devices includes:

a non-volatile storage medium configured to store host data;

a host interface configured to connect to at least one host system; and a physical debug port configured to connect to a peer communication channel;

the peer communication channel is configured to operate during the peer communication channel mode; and the host interface and the physical debug port comprise separate physical interfaces;

determining, by the first data storage device, a set of host data from the non-volatile storage medium of the first data storage device; and sending, through the peer communication channel, the set of host data to the target peer data storage device.

12. The computer-implemented method of claim 11, further comprising:

reading, by the first data storage device, the set of host data from the non-volatile storage medium of the first data storage device into a first storage buffer of the first data storage device; and receiving, by the target peer data storage device, the set of host data to a second storage buffer of the target peer data storage device, wherein:

sending the set of host data is from the first storage buffer;

the second storage buffer is configured to temporarily store the set of host data prior to storing the set of host data in the non-volatile storage medium of the target peer data storage device;

the first storage buffer is separate from a controller memory buffer of the first data storage device;

the second storage buffer is separate from a controller memory buffer of the target peer data storage device; and the controller memory buffers are accessible to the at least one host system through the host interfaces.

13. The computer-implemented method of claim 12, further comprising:

processing, by the first data storage device and using the controller memory buffer of the first data storage device, host data storage operations in parallel with the sending the set of host data to the target peer data storage device.

14. The computer-implemented method of claim 11, further comprising:

initiating, by the first data storage device and using a second storage interface protocol, a master mode prior to sending the set of host data; and initiating, by the target peer data storage device and using the second storage interface protocol, a slave mode prior to receiving the set of host data, wherein the first data storage device and the plurality of peer data storage devices use a first storage interface protocol for receiving host storage operations from the at least one host system.

15. The computer-implemented method of claim 11, further comprising:

switching between the debug mode and the peer communication channel mode for using the physical debug port, wherein the switching is responsive to completing configuration of the first data storage device.

16. The computer-implemented method of claim 11, further comprising:

determining, by the first data storage device, a peer transfer queue;

adding, by the first data storage device, the set of host data to the peer transfer queue;

monitoring, by the first data storage device, transfer of the set of host data over the peer communication channel; and determining, by the first data storage device, whether the set of host data has been successfully transferred to the target peer data storage device.

17. The computer-implemented method of claim 16, further comprising:

determining, by the first data storage device, host storage operations targeting the set of host data;

adding, by the first data storage device and responsive to the host storage operations targeting the set of host data, updated host data to the peer transfer queue;

receiving, by the first data storage device and from a storage controller, a changeover notification;

completing, by the first data storage device and during a changeover time period, transfer of the updated host data in the peer transfer queue; and sending, from the first data storage device to the storage controller and responsive to completion of the transfer of the updated host data in the peer transfer queue, a queues clear notification.

18. The computer-implemented method of claim 11, further comprising:

determining, by a storage controller in communication with the first data storage device and the plurality of peer data storage devices, a maintenance condition of the first data storage device;

determining, by the storage controller, the set of host data;

determining, by the storage controller, the target peer data storage device from the plurality of peer data storage devices;

sending, by the storage controller, a migration source notification to the first data storage device; and sending, by the storage controller, a migration destination notification to the target peer data storage device.

19. The computer-implemented method of claim 18, further comprising:

determining, by the storage controller, a set of physical functions corresponding to the set of host data;

sending, by the storage controller and during a migration window, host storage operations targeting the set of host data to the first data storage device;

receiving, by the storage controller and from the first data storage device, a transfer complete notification;

initiating, by the storage controller, a changeover window;

during the changeover window:

pausing, by the storage controller, host storage operations targeting the set of host data;
copying, by the storage controller, the set of physical functions from a first configuration for the first data storage device to a second configuration for the target peer data storage device; and
mapping, by the storage controller, the target peer data storage device to the at least one host system for the set of host data; and initiating, by the storage controller, a maintenance operation for the first data storage device.

20. A storage system, comprising:
a peer communication channel;
means for determining a maintenance condition of at least one peer data storage device from a plurality of peer data storage devices;
means for determining a set of host data;
means for determining a target peer data storage device from the plurality of peer data storage devices;
means for sending a migration source notification to the at least one peer data storage device of the plurality of peer data storage devices;
means for sending a migration destination notification to the target peer data storage device; and
a plurality of peer data storage devices, wherein each peer data storage device of the plurality of peer data storage devices comprises:
a processor;
a memory;
a non-volatile storage medium;
a host interface configured to connect to at least one host system;
a peer interface configured to connect to the peer communication channel, wherein the host interface and the peer interface are separate physical interfaces;
means for establishing, through the peer communication channel, peer communication with a target peer data storage device from the plurality of peer data storage devices;
means for determining a set of host data from the non-volatile storage medium; and
means for sending, through the peer communication channel, the set of host data to the target peer data storage device.

21. A data storage device, comprising:
a processor;
a memory;
a non-volatile storage medium configured to store host data;
a host interface configured to connect to at least one host system;
a storage interface protocol configured for communication with the host system through the host interface;
a controller memory buffer accessible to the at least one host system through the host interface;
a non-volatile memory device controller configured to manage data input/output to the non-volatile storage medium;
a storage buffer, controlled by the non-volatile memory device controller, configured to temporarily store data input/output to the non-volatile storage medium;
a peer interface configured to connect to a peer communication channel, wherein:
a plurality of peer data storage devices is configured to connect to the peer communication channel; and
the host interface and the peer interface comprise separate physical interfaces; and
a peer interface service configured to:
establish, through the peer communication channel, peer communication with a target peer data storage device from the plurality of peer data storage devices;
determine a set of host data from the non-volatile storage medium; and
send, through the peer communication channel and from the storage buffer, the set of host data to the target peer data storage device.

* * * * *